Figure 1:
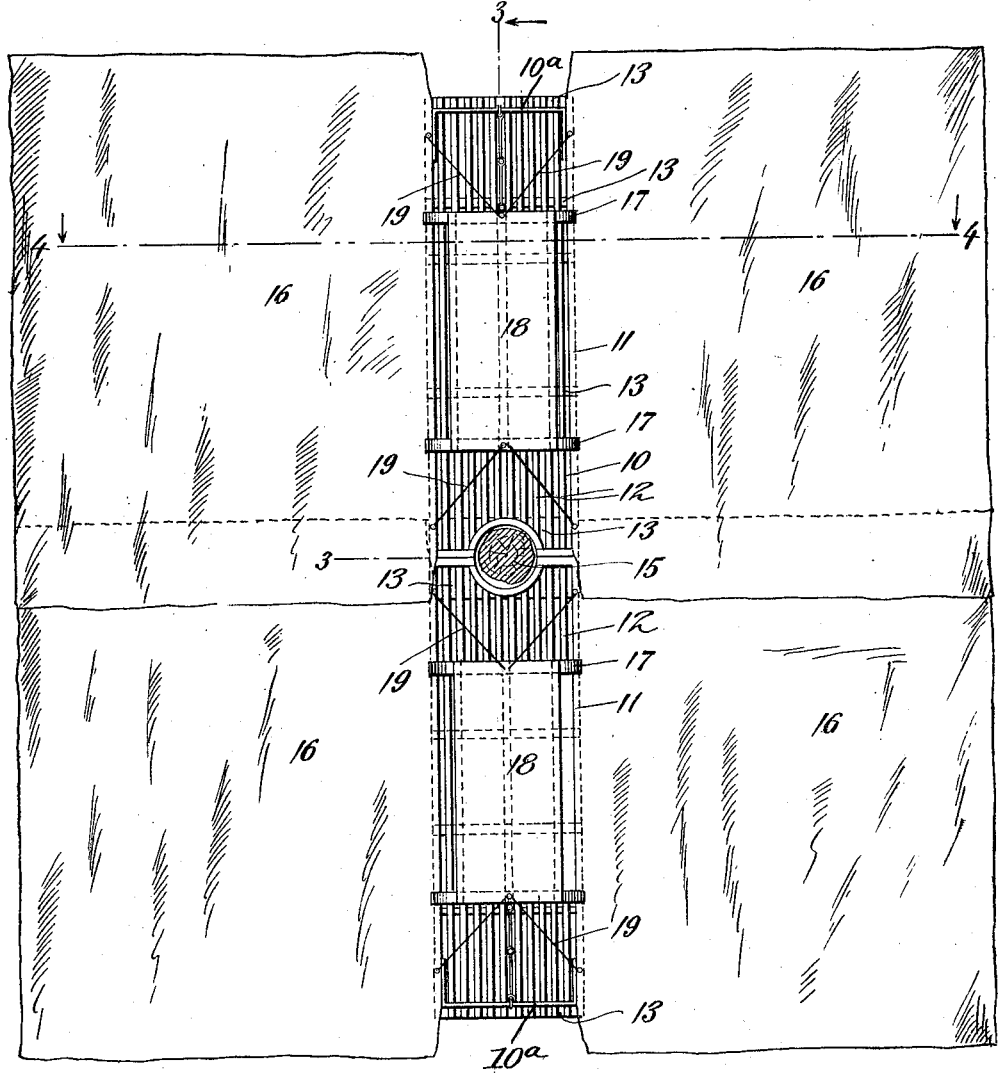

C. R. SATTERBERG.
FRUIT RECEIVER.
APPLICATION FILED OCT. 1, 1912.

1,121,406.

Patented Dec. 15, 1914.
2 SHEETS—SHEET 1.

Inventor
Carl R. Satterberg

Witnesses
Geo. Ackman
P. H. Hoster

By Victor J. Evans
Attorney

C. R. SATTERBERG.
FRUIT RECEIVER.
APPLICATION FILED OCT. 1, 1912.
1,121,406.
Patented Dec. 15, 1914.
2 SHEETS—SHEET 2.
Fig. 2.
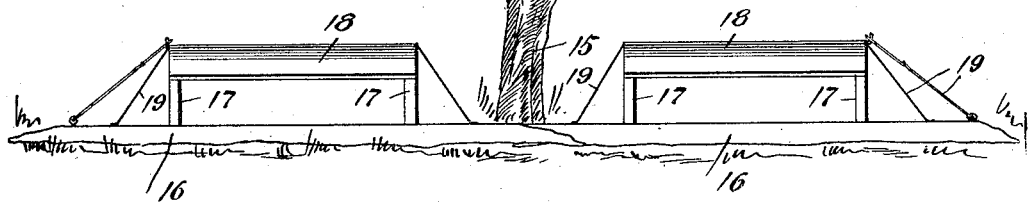
Fig. 3.
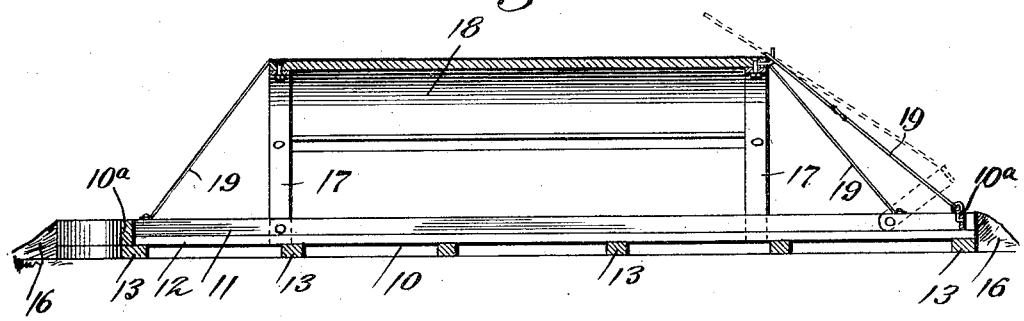
Fig. 4.
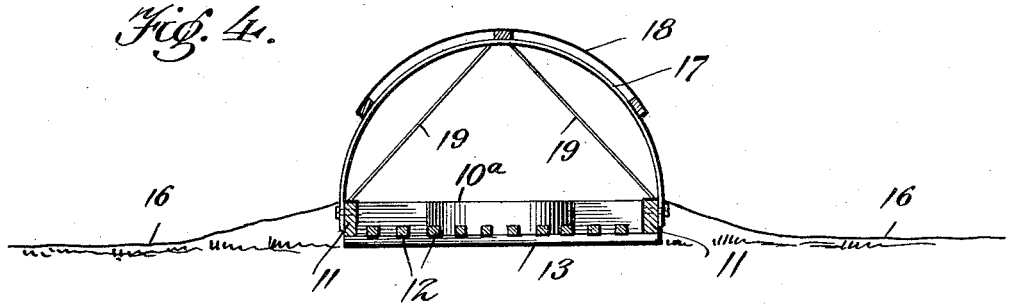
Inventor
Carl R. Satterberg.
Witnesses
By Victor J. Evans
Attorney

UNITED STATES PATENT OFFICE.

CARL RICHARD SATTERBERG, OF KINGSBURG, CALIFORNIA.

FRUIT-RECEIVER.

1,121,406.    Specification of Letters Patent.    Patented Dec. 15, 1914.

Application filed October 1, 1912. Serial No. 723,383.

*To all whom it may concern:*

Be it known that I, CARL R. SATTERBERG, a citizen of the United States, residing at Kingsburg, in the county of Fresno and State of California, have invented new and useful Improvements in Fruit-Receivers, of which the following is a specification.

An object of the invention is to provide a device for receiving fruit when the same is shaken or otherwise loosened from the tree.

The invention embodies, among other features, a plurality of receiving platforms, which are preferably arranged beneath the tree bearing the fruit, the said platforms having blankets of canvas or other material attached thereto and which, together with the platforms, cover the ground beneath the tree, a cover being provided for the platforms so that the fruit, when shaken or otherwise released from the tree, will not be bruised by striking the platforms, but will roll on to the blankets, after which the edges of the blankets, are raised to roll the fruit toward and on to the platforms, the platforms being then carried to suitable receptacles and elevated so that the fruit will roll therefrom and into the receptacles.

In the further disclosure of the invention reference is to be had to the accompanying drawings, constituting a part of this specification, in which similar characters of reference denote corresponding parts in all the views, and in which:

Figure 1 is a plan view of the device, the trunk of a tree being shown in section to disclose the position of the platforms and blankets when arranged relatively to the tree; Fig. 2 is a side elevation; Fig. 3 is a vertical sectional view taken on the line 3—3 in Fig. 1; and Fig. 4 is a vertical transverse sectional view taken on the line 4—4 in Fig. 1.

Referring more particularly to the views, use is made of a plurality of platforms 10, each consisting of a rectangular frame 11 having spaced bars 12 mounted thereon and arranged to extend longitudinally thereto to form a lattice work construction, cross pieces 13 being provided for securing the bars 12 in position and reinforcing the same. The inner ends of the platforms 10 are provided with semi-circular cut away portions in which the trunk 15 of a tree is received when the platforms are mounted upon the ground so that the platforms will encircle the trunk of the tree adjacent the ground, as shown in Fig. 1.

A series of blankets 16 are secured to the longitudinal edges of the frames 11 and are spread outwardly as shown in Fig. 1 when the device is placed in use. Curved supporting members 17 are secured to the frames 11 and extend transversely over the platforms 10 to receive and support covers 18, preferably made of cloth and adapted to prevent the fruit, when released from the tree, from striking the platform and thereby being bruised or squashed, the said covers being spaced from the platforms as shown and secured rigidly at their ends to the platforms by suitable cords 19. The outer ends of the platform terminate in end pieces or extensions $10^a$ which not only serve as a means for holding the fruit upon the frame and preventing its rolling off of the ends when the frame is carried away from beneath the tree, but also serve to greatly strengthen the frame at its extremities and where it is lifted to be carried away.

In the use of the device described, the platforms 10 are first arranged beneath the tree so that the platforms will encircle the tree adjacent the ground as shown in Fig. 1 and the blankets 16 are then unfolded, as is also shown in Fig. 1. The fruit is now shaken from the tree and will fall upon the blankets, it being readily seen that the fruit will be prevented from striking the platforms and becoming bruised in view of the provision of the covers 18 for the platforms and if the fruit should strike the covers, the same will roll therefrom on to the blankets. The edges of the blankets are now gathered together and raised from the ground, thus causing the fruit to roll toward and on to the platforms 10, the mentioned blankets being folded over the covers 18, thus, together with the platforms, forming pockets in which the fruit will lie. The platforms are now separately carried to suitable receptacles and then by raising one end of each platform the fruit can be readily dumped into the receptacles. By employing a lattice work construction of the platforms, any fruit which is of small size or immature, together with leaves or twigs that may have dropped with the fruit on to the blankets, will drop through the spaces formed between the bars 12 and cross pieces 13 so that only fruit of proper size will pass into the receptacles, it being thus seen that in a few operations the fruit can be gathered in large quantities and dumped into the required receptacles without necessitating a repicking or reëxamination of the fruit in order to remove any dead wood, twigs, or immature fruit.

The platforms 10 are preferably made of wood or some other light material and the blankets 16 are preferably made of canvas, the entire device being very durable and at the same time of a light construction so that the same can be conveniently and readily carried from the tree to the receptacles into which it is desired to dump the fruit.

Having thus described my invention, I claim:

In a fruit gatherer, the combination with a fruit receiving platform having a floor formed of a series of longitudinally extending slats, with one end of the platform having a semicircular cut away portion so that the said end of the platform can be fitted partially around the tree having the fruit thereon, of blankets having their inner edges attached to the longitudinal edges of the platform with the said blankets unfoldable in opposite directions to cover the ground adjacent the sides of the platform, spaced arch-like supporting members on the platform adjacent its ends, each of said arch-like supporting members having a semicircular configuration, a cover carried on the said supporting members to cover the medial portion of the platform with the said cover spanning said supporting members, and reinforcing cords connected to the said supporting members and the platform whereby the cover will be held taut and assume a curved shape similar to the said supporting members, the said blankets being adapted to be folded around the cover and the said arch-like supporting members when the fruit has been received upon the blanket, and whereby the fruit will be disposed upon the said platform, the curvature of the said cover being adapted to direct any fruit which falls thereon onto the said blankets and protect the fruit from becoming bruised or mashed in the event it falls from the tree immediately over and above the platform.

In testimony whereof I affix my signature in presence of two witnesses.

CARL RICHARD SATTERBERG.

Witnesses:
C. H. ROSENDAHL,
E. ED. PETERSON.

Copies of this patent may be obtained for five cents each, by addressing the "Commissioner of Patents, Washington, D. C."